Feb. 26, 1963    G. W. PAINTER    3,079,277
DAMPED STRUCTURE
Filed Nov. 16, 1959

Giles W Painter
INVENTOR.

BY Ralph Hammar
Attorney

3,079,277
DAMPED STRUCTURE
Giles W. Painter, Erie, Pa., assignor to Lord Manufacturing Company, Erie, Pa., a corporation of Pennsylvania
Filed Nov. 16, 1959, Ser. No. 853,065
3 Claims. (Cl. 117—121)

It has been suggested that the vibration of structures be reduced by coatings of viscoelastic damping material. Because the structures are so much stiffer (have a much higher modulus of elasticity) than the damping materials, effective damping action frequently requires a coating of damping material several times the thickness of the structure.

The present invention is intended to reduce the required thickness of the coating of damping material by incorporating in the damping material thin, relatively stiff, or high modulus plates in such quantity that the plates are in at least partial overlapping relation somewhat in the manner of fish scales and are separated from each other by thin layers of the low modulus damping material. As the structure is bent, the overlapping plates slide relative to each other and the intervening viscoelastic layers are subjected to shear strain thereby increasing the damping action so that effective damping of the structure can be obtained with a coating of damping material of much less over-all thickness. In many cases, the thickness of the coating required for effective damping is reduced from several times the thickness of the structure to a thickness substantially the same as that of the structure.

Figure 1:
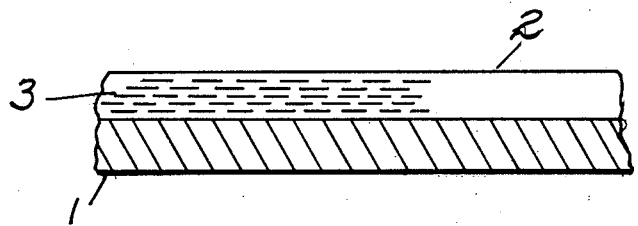
Figure 2:
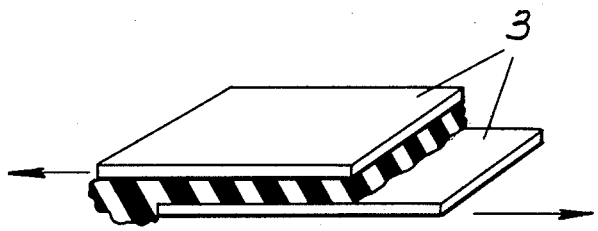

In the drawing, FIG. 1 is a section through a structure having a coating of damping material and FIG. 2 is a diagrammatic view illustration of the shearing action between two of the overlapping plates embedded in the viscoelastic damping material.

In the drawing, the structure subject to vibration is indicated by the reference numeral 1 and the vibration damping coating applied to one surface of the structure is indicated by the reference numeral 2. The structure, for example, could be a panel which might be of irregular shape rather than plane as illustrated. Viscoelastic damping materials are well known. See for example British Patent 513,171. Such damping materials are characterized by high mechanical hysteresis or internal friction and by a modulus of elasticity low compared to structural materials.

The coating 2 of low modulus viscoelastic material has embedded therein a plurality of high modulus plates 3 which overlap somewhat in the manner of fish scales and which are wet on both sides by the viscoelastic material. The plates may be regularly arranged or randomly distributed so long as there is a substantial area of overlap between adjacent plates. The size of the plates is not critical. The area of the plates should be large compared to the thickness of the individual plates and small compared to the surface to which the coating is applied. Square plates ¼" on a side and ³⁄₁₀₀₀" thick are a convenient size. Plates of this size or larger are readily distributed in a random fashion in the viscoelastic material which may then be applied with a trowel to the structure, subject to vibration. As the coating is trowelled, the plates tend to assume a position generally parallel to the surface of the coating.

As the structure 1 is deflected, a tension stress is developed on one side of the neutral axis while a compression stress is developed on the opposite side of the neutral axis. This results in relative sidewise movement between adjacent plates as indicated in FIG. 2 subjecting the intervening layer of viscoelastic material to a shear strain. Since the viscoelastic layer between adjacent plates is very thin, a relatively small movement between adjacent plates results in a substantial shear strain in the viscoelastic material which produces the damping. Since the plates are dispersed throughout the coating, the damping action takes place throughout the entire thickness with the result that the coating may be much thinner than as though the plates were omitted. Satisfactory damping can be obtained with the coating of substantially the same thickness as the structure. If the plates were omitted, the coating would have to be several times the thickness of the structure in order to have the same damping.

What is claimed as new is:

1. A structure having on a surface subject to vibration an adherent coating of viscoelastic damping material of modulus of elasticity low compared to the modulus of elasticity of the structure having embedded therein a plurality of plates of modulus of elasticity high compared to the modulus of elasticity of the viscoelastic material and of area small compared to said surface and with adjacent plates in at least partial overlapping relation to each other and separated from each other by intermediate adherent layers of viscoelastic material, said plates being oriented generally parallel to said surface so as to shear the intermediate layers as said surface vibrates.

2. A structure having on a surface subject to vibration an adherent coating of a plurality of plates each wet on both sides with viscoelastic damping material of modulus of elasticity low compared to the modulus of elasticity of the structure and arranged in a plurality of layers united to each other and to said surface by the viscoelastic material, the plates in adjacent layers being of modulus of elasticity high compared to the modulus of elasticity of the viscoelastic material and in at least partial overlapping relation to each other and generally parallel to said surface whereby said plates shear the viscoelastic material as said surface vibrates.

3. A structure having on a surface subject to vibration an adherent coating of viscoelastic damping material of modulus of elasticity low compared to the modulus of elasticity of the structure having embedded therein multiple layers of a plurality of plates of modulus of elasticity high compared to the modulus of elasticity of the viscoelastic material and of area small compared to said surface and with adjacent plates in at least partial overlapping relation to each other in the manner of fish scales and separated from each other by intermediate adherent layers of viscoelastic material.

References Cited in the file of this patent
UNITED STATES PATENTS

| | | |
|---|---|---|
| 2,562,004 | Watson et al. | July 24, 1951 |
| 2,568,004 | Heyman | Sept. 18, 1951 |
| 2,575,733 | Schulman et al. | Nov. 20, 1951 |
| 2,704,105 | Robinson et al. | Mar. 15, 1955 |